United States Patent
Vortkort et al.

(10) Patent No.: US 7,183,343 B2
(45) Date of Patent: Feb. 27, 2007

(54) THERMOPLASTIC VULCANIZATE WITH IMPROVED SURFACE PROPERTIES

(75) Inventors: Jörg Vortkort, Garstedt (DE); Jörg Wallach, Achter de Stadt 8 47669, Wachtendonk (DE)

(73) Assignees: Polyone Coproration, Avon Lake, OH (US); Jörg Wallach, Wachtendonk (GB)

( * ) Notice: Subject to any disclaimer, the term of this patent is extended or adjusted under 35 U.S.C. 154(b) by 233 days.

(21) Appl. No.: 10/782,753

(22) Filed: Feb. 23, 2004

(65) Prior Publication Data

US 2005/0187337 A1   Aug. 25, 2005

(51) Int. Cl.
   *C07C 67/08*   (2006.01)
(52) U.S. Cl. ...................... 524/310; 524/502
(58) Field of Classification Search ........... 524/310, 524/502, 510
   See application file for complete search history.

(56) References Cited

U.S. PATENT DOCUMENTS

| | | | |
|---|---|---|---|
| 3,806,558 A | 4/1974 | Fischer et al. | 525/198 |
| 4,130,535 A | 12/1978 | Coran et al. | 524/487 |
| 4,311,628 A | 1/1982 | Abdou-Sabet et al. | 524/447 |
| 5,159,014 A | 10/1992 | Tsutsumi et al. | 525/66 |
| 5,430,117 A | 7/1995 | Kawasaki et al. | 526/336 |
| 5,596,042 A | 1/1997 | Itoh et al. | 525/98 |
| 5,639,810 A | 6/1997 | Smith, III et al. | 524/269 |
| 5,702,827 A | 12/1997 | Itoh et al. | 428/519 |
| 5,728,744 A | 3/1998 | Okada et al. | 521/95 |
| 5,843,577 A | 12/1998 | Ouhadi et al. | 428/474.7 |
| 5,856,399 A | 1/1999 | Itoh et al. | 524/505 |
| 6,143,827 A | 11/2000 | Morizono et al. | 525/192 |
| 6,143,828 A | 11/2000 | Chee et al. | 525/192 |
| 6,221,965 B1 | 4/2001 | Grabner et al. | 525/192 |
| 6,303,666 B1 | 10/2001 | Yorita et al. | 521/79 |
| 6,310,164 B1 | 10/2001 | Morizono et al. | 526/339 |

FOREIGN PATENT DOCUMENTS

| | | |
|---|---|---|
| WO | WO 00/49086 | 8/2000 |
| WO | WO 2005/012410 | 2/2005 |
| WO | WO 2005/017011 | 2/2005 |
| WO | WO 2005/123829 | 12/2005 |

*Primary Examiner*—Peter D. Mulcahy
(74) *Attorney, Agent, or Firm*—John H. Hornickel

(57) ABSTRACT

The invention concerns a thermoplastic vulcanizate, comprising the following components: a thermoplastic (A); an at least partially vulcanized rubber (B); a plasticizer (C); conventional additives (D); and a surface modifier (E), which migrates uniformly onto the surface of the vulcanizate and forms a continuous, waxlike, solid layer.

5 Claims, No Drawings

THERMOPLASTIC VULCANIZATE WITH IMPROVED SURFACE PROPERTIES

FIELD OF THE INVENTION

The invention concerns a thermoplastic vulcanizate, comprising the following four components (A, B, C, D), namely: a thermoplastic (A); an at least partially vulcanized rubber (B); a plasticizer (C) and conventional additives (D).

BACKGROUND OF THE INVENTION

Thermoplastic vulcanizates are a blend consisting of a thermoplastic and a cross-linked elastomer. The cross-linking of the elastomer takes place by dynamic vulcanization. By the term dynamic vulcanization is meant a process in which the thermoplastic, the rubber and the cross-linking system are masticated, while the rubber is cross-linked. Examples of dynamically cross-linked thermoplastic elastomers and the method of dynamic vulcanization are described in the U.S. Pat. No. 4,130,535 and U.S. Pat. No. 4,311,628.

In U.S. Pat. No. 4,130,535, a blend is described made from a thermoplastic polyolefin, an EPDM-rubber, and any cross-linking system made known from U.S. Pat. No. 3,806,558. The rubber is vulcanized to such an extent that it contains not more than roughly three percent of rubber extractable in cyclohexane at 23° C.

GB-A-2,007,683 describes a thermoplastic elastomer, containing a thermoplastic crystalline polyolefin resin and vulcanized EPDM. The cross-linking of the rubber occurs with a phenolic resin. The achieved degree of cross linking is greater than 97%.

In WO-A-98/58020, a TPE blend is described based on a thermoplastic olefin, an EPDM rubber, and an ethylene-octene copolymer (EOC). The thermoplastic vulcanizates presented in this publication are prepared without plasticizing oils. Furthermore, a novel cross-linking system is employed. The cross-linking system consists of a phenolic resin and an oxide based on Mg, Pb or Zn. This system results in a partial cross linking of the EOC.

A further development in the field of thermoplastic vulcanizates is described in patent application publication WO 00/49086A1, which also contains the above-mentioned composition of four components (A, B, C, D).

The above-presented thermoplastic vulcanizates have a rubber-like surface with pleasant haptics. These surface properties are wanted and advantageous for countless applications. For other applications, however, the good grip (high coefficient of adhesive friction) of these surfaces is of great disadvantage.

Due to their formula, the thermoplastic vulcanizates with a hardness of <80 Shore A in particular have very matted surfaces. These surfaces result in problems when molded parts or extrudates of thermoplastic vulcanizates have to be pushed into or inserted into other molded parts or when extrudates or molded parts of other materials have to be assembled with sealing elements of thermoplastic vulcanizates. Also, applications in which relative motions occur between two contacting surfaces are difficult to realize with thermoplastic vulcanizates. The high coefficients of friction result in increased abrasion, heating, and possibly noise. In order to facilitate the inserting of seals, plugs, or nozzles and to enable the leading of, for example, cable strands through sealing elements in general, the surfaces of the molded part or extrudate must be treated with external lubricants.

At present, there are two customary methods:

1. The lubricant applied to the surfaces of the molded parts or extrudates can be, for example, greases, oils, or powders (talc).

Disadvantage: Besides the additional work involved during the assembly, one must also ensure cleanliness when handling the lubricants. Moreover, the drawbacks listed under item 2 also apply.

2. The processed thermoplastic vulcanizate contains an oil, such as silicone oil, which migrates onto the surface by virtue of the polarity and forms an oily layer there.

Disadvantage: The substances used at present form an oily film, which makes the handling difficult (greasy hands, entrainment of the lubricant) and, moreover, it is easily removed from the surface and thus is not durable. Furthermore, the surfaces bind dust and grime.

SUMMARY OF THE INVENTION

In order to avoid all of the drawbacks mentioned here, the further developed thermoplastic vulcanizate is characterized in that the mixture also contains a surface modifier (E), which migrates uniformly onto the surface and forms a continuous, waxlike, solid layer.

This layer is smooth and, because of the low coefficient of friction, it enables an easy assembly of seals, plugs and nozzles. Merchant shapes, cables, or wires can also be easily led through sealing elements. The wax layer does not bind any dust or impurities onto the surface.

The individual components (A, B, C, D, E) shall be presented more closely hereafter.

EMBODIMENTS OF THE INVENTION

Thermoplastic (A)

The plastic preferably used is a polypropylene based on a homopolymer, copolymer or block-copolymer, again preferably in conjunction with a high crystallinity.

The quantitative portion of the thermoplastic is advisedly 60 to 5 wt. %, especially 50 to 15 wt. %, and this in reference to the total of the three components (A, B, C).

Vulcanized Rubber (B)

The vulcanized rubber used is preferably an EPDM rubber. The third monomer can be hexadiene-1,4, dicyclopentadiene or ethylidene-norbornene. Preferably, EPDM with ethylidene-norbornene is used. Pellet-shaped, freely flowing EPDM types are most preferred. Any known cross-linking system is suitable for the vulcanization of the rubber. As examples, one can mention peroxide, silane, phenolic resin and radiation cross linking. Tin dichloride, for example, is used as accelerator.

The rubber preferably has a degree of cross-linking of >90%, in particular, >95%. One method of determining the degree of cross-linking is described in patent U.S. Pat. No. 4,311,628.

The preferred quantitative portion of the rubber is 20 to 45 wt. %, especially 25 to 40 wt. %, again in reference to the total of the three components (A, B, C).

Plasticizer (C)

Any suitable plasticizer can be used for extending the rubber. Paraffinic or naphthalic oils are used in particular for extending the EPDM rubber. In this connection, the plasticizing oil is advisedly a paraffinic oil with an aromatic component of <4 wt. %, and this in reference to the total mass of the plasticizer. In particular, however, an aromatic-free plasticizer oil is used.

The quantitative portion of plasticizer is preferably 20 to 50 wt. %, especially 25 to 45 wt. %, and this again in reference to the total of the three components (A, B, C).

Additives (D)

An important component is the cross-linker or the cross-linking system, which also contains cross-linking adjuvants (e.g., accelerators).

The other mixture ingredients can comprise all raw material components that positively influence the properties pattern and/or the costs of the thermoplastic vulcanizate. For example, these are fillers, aging protectants, UV stabilizers, UV absorbers, color pigments, flameproofing agents, flow promoters and process adjuvants.

The additives are advisedly added in 0.02 to 0.5-fold quantitative amount, and this in reference to the total of the three components (A, B, C).

Surface Modifier (E)

The surface modifier is advisedly a substance from the group of the hydroxy stearates and/or their derivatives. Of special significance in this regard is a methylhydroxystearate or a hydrogenated castor oil.

The surface modifier is advisedly added in 0.005 to 0.1-fold quantitative amount, and this in reference to the total of the four components (A, B, C, D).

Regarding other material-specific details of the four components (A, B, C, D), refer in particular to the patent application publication WO 00/49086A1 which has entered the United States National Stage as U.S. patent application Ser. No. 09/913,613 (Vortkort et al), the disclosures of both of which are incorporated by reference as if rewritten herein.

EXAMPLES

Making use of two sample embodiments, the improved surface properties of the invented thermoplastic vulcanizate shall now be illustrated, making reference to the commercial PHOENOPRENE® Standard types 1264 and 2555 (manufacturer: PHOENIX AG of Waltershausen, Germany), which contain the four components (A, B, C, D).

The values of adhesive friction and sliding friction were measured using two test bodies being rubbed against each other, first without the surface modifier (E) and then with this additive mixed in. The surface modifier each time was hydrogenated castor oil.

The testing was done according to DIN 53375.

Example 1

TABLE 1

| Friction partner: PHOENOPRENE ® 1264 | | |
| --- | --- | --- |
| Measured value | without (E) | with (E) |
| Adhesive friction value | 1.3 | 0.4 |
| Sliding friction value | 1.3 | 0.2 |

Example 2

TABLE 2

| Friction partner: PHOENOPRENE ® 2555 | | |
| --- | --- | --- |
| Measured value | without (E) | with (E) |
| Adhesive friction value | 1.6 | 0.4 |

TABLE 2-continued

| Friction partner: PHOENOPRENE ® 2555 | | |
| --- | --- | --- |
| Measured value | without (E) | with (E) |
| Sliding friction value | 1.6 | 0.2 |

As the two test examples show, a distinct reduction of the adhesive friction values and sliding friction values occurs when the surface modifier is mixed in.

The most optimal values are achieved when the thermoplastic vulcanizate has a composition according to the following Table 3.

TABLE 3

| Ingredient | Weight Percent |
| --- | --- |
| Thermoplastic (A) | 15–50 |
| Rubber (B) | 25–40 |
| Plasticizer (C) | 25–45 |
| Additives (D) | 0.02 to 0.5-fold weight amount in reference to the total of the three components (A, B, C). |
| Surface Modifier (E) | 0.005 to 0.1-fold weight amount in reference to the total of the four components (A, B, C, D). |

The invention is not limited to the above embodiments. The claims follow.

What is claimed is:

1. A thermoplastic vulcanizate, comprising:
   a thermoplastic (A);
   an at least partially vulcanized rubber (B);
   a plasticizer (C);
   conventional additives (D) other than plasticizer or surface modifier; and
   a surface modifier (E) containing hydrogenated castor oil, which migrates uniformly onto a surface and forms a wax layer.

2. The thermoplastic vulcanizate according to claim 1, wherein conventional additives are selected from the group consisting of fillers, aging protectants, UV stabilizers, UV absorbers, color pigments, flameproofing agents, flow promoters and process adjuvants.

3. The thermoplastic vulcanizate according to claim 1, wherein the vulcanizate has the following quantitative portions in regard to components (A, B, C):

| thermoplastic rubber (A) | 60 to 5 wt. % |
| --- | --- |
| rubber (B) | 20 to 45 wt. % |
| plasticizer (C) | 20 to 50 wt. %. |

4. The thermoplastic vulcanizate according to claim 3 wherein the conventional additives (D) are added in 0.02 to 0.5-fold weight amount, in reference to the total of the three components (A, B, C).

5. The thermoplastic vulcanizate according to claim 4 wherein the surface modifier (B) is added in 0.005 to 0.1-fold weight amount, in reference to the total of the four components (A, B, C, D).

* * * * *